US009954847B2

(12) United States Patent
Katieb

(10) Patent No.: US 9,954,847 B2
(45) Date of Patent: Apr. 24, 2018

(54) COMPUTER READABLE STORAGE MEDIA FOR LEGACY INTEGRATION AND METHODS AND SYSTEMS FOR UTILIZING SAME

(71) Applicant: Document Storage Systems, Inc., Juno Beach, FL (US)

(72) Inventor: Ralph Katieb, Minneapolis, MN (US)

(73) Assignee: DOCUMENT STORAGE SYSTEMS, INC., Juno Beach, FL (US)

( * ) Notice: Subject to any disclaimer, the term of this patent is extended or adjusted under 35 U.S.C. 154(b) by 0 days.

(21) Appl. No.: 15/435,688

(22) Filed: Feb. 17, 2017

(65) Prior Publication Data

US 2017/0163630 A1 Jun. 8, 2017

Related U.S. Application Data

(62) Division of application No. 14/580,604, filed on Dec. 23, 2014, now Pat. No. 9,613,204.

(51) Int. Cl.
*H04L 29/06* (2006.01)
*G06F 21/45* (2013.01)

(52) U.S. Cl.
CPC .......... *H04L 63/0815* (2013.01); *G06F 21/45* (2013.01); *H04L 63/0281* (2013.01)

(58) Field of Classification Search
CPC .. H04L 63/0815; H04L 63/0281; G06F 21/45
USPC .................................................. 762/8; 726/8
See application file for complete search history.

(56) References Cited

U.S. PATENT DOCUMENTS 7,076,795 B2 7/2006 Hahn
8,255,491 B1 8/2012 Arzur
8,255,984 B1 * 8/2012 Ghostine ................ G06F 21/41 709/217
9,613,204 B2 4/2017 Katieb
2002/0078379 A1 * 6/2002 Edwards ............ H04L 63/0281 726/14
2004/0199795 A1 10/2004 Grewal et al.
2005/0125699 A1 6/2005 Harper
(Continued)

FOREIGN PATENT DOCUMENTS

WO 2016106061 A1 6/2016

OTHER PUBLICATIONS

International Search Report and Written Opinion of the International Searching Authority for International Patent pplication No. PCT/US2015/066287, dated Apr. 29, 2016 (12 pages).

*Primary Examiner* — Michael S McNally
(74) *Attorney, Agent, or Firm* — Dorsey & Whitney LLP

(57) ABSTRACT

Systems and methods for integrative legacy context management are disclosed herein. An example computer hardware system may include at least one processing unit coupled to a memory, and the memory may be encoded with computer executable instructions that when executed cause the at least one processing unit to receive a set of credentials associated with a user from a user device, cross-reference the set of credentials with a first set of credentials of an agent associated with the user to determine whether the set of credentials is valid; and if the set of credentials is valid, provide a second set of credentials of the agent to the user device in response to a request for the second set of credentials from the user device.

19 Claims, 5 Drawing Sheets

(56) References Cited

U.S. PATENT DOCUMENTS

| | | | | |
|---|---|---|---|---|
| 2005/0177731 | A1* | 8/2005 | Torres | H04L 67/02 713/182 |
| 2007/0226783 | A1 | 9/2007 | Mimlitsch | |
| 2007/0234408 | A1* | 10/2007 | Burch | G06F 21/31 726/6 |
| 2008/0086770 | A1* | 4/2008 | Kulkarni | H04L 63/0876 726/20 |
| 2008/0263365 | A1 | 10/2008 | Aupperle et al. | |
| 2008/0263629 | A1 | 10/2008 | Anderson | |
| 2011/0247060 | A1 | 10/2011 | Whitmyer, Jr. | |
| 2012/0227094 | A1 | 9/2012 | Begen et al. | |
| 2012/0266220 | A1 | 10/2012 | Brudnicki et al. | |
| 2013/0086210 | A1* | 4/2013 | Yiu | G06F 21/41 709/217 |
| 2014/0143554 | A1 | 5/2014 | Torkkel | |
| 2014/0337941 | A1 | 11/2014 | Kominar et al. | |
| 2015/0312249 | A1 | 10/2015 | Lau | |

* cited by examiner

COMPUTER READABLE STORAGE MEDIA FOR LEGACY INTEGRATION AND METHODS AND SYSTEMS FOR UTILIZING SAME

CROSS-REFERENCE TO RELATED APPLICATION

This application is a divisional of U.S. patent application Ser. No. 14/580,604, filed Dec. 23, 2014, now U.S. Pat. No. 9,613,204 and entitled COMPUTER READABLE STORAGE MEDIA FOR LEGACY INTEGRATION AND METHODS AND SYSTEMS FOR UTILIZING SAME." The entirety of which is hereby incorporated by reference for all purposes.

TECHNICAL FIELD

Embodiments of the present disclosure relate generally to legacy systems, and more specifically to integrative legacy context management.

BACKGROUND

Contemporary enterprise systems have made significant strides in integrating various security, communication, and authentication mechanisms to provide relatively seamless user experiences across various features and services with an enterprise. However, despite such improvements, modernization of enterprise systems has not yet adequately addressed the integration of legacy systems having limited extensibility. Many organizations are forced to maintain separate legacy and enterprise systems as legacy systems typically do not integrate properly with enterprise systems.

SUMMARY

Certain implementations may include a computer hardware system having a processing unit coupled to a memory encoded with computer executable instructions that when executed cause the processing unit to: receive a set of credentials associated with a user from a user device; cross-reference the set of credentials with a first set of credentials of an agent associated with the user to determine whether the set of credentials is valid; and, if the set of credentials is valid, provide a second set of credentials of the agent to the user device in response to a request for the second set of credentials from the user device. In certain implementations, the memory may be further encoded with computer executable instructions that when executed cause the processing unit to, among other operations, direct a browser of the user device to a web-based interface, the web-based interface configured to receive the set of credentials; and/or establish a proxy connection between the user device and the legacy device. In certain implementations, the second set of credentials of the agent may be associated with a service provided by a legacy server. The web-based interface may be based on a type of the user device. The set of credentials may be associated with an enterprise server. The instructions that when executed cause the at least one processing unit to cross-reference the set of credentials with a first set of credentials of an agent associated with the user to determine whether the set of credentials is valid may include instructions that when executed cause the at least one processing unit to provide an API call to at least one of a directory integration API or a legacy authentication integration API. The instructions that when executed cause the at least one processing unit to provide a second set of credentials of the agent to the user device may include instructions that when executed cause the at least one processing unit to provide the second set of credentials to a proxy executing on the user device.

Certain implementations may include a computer hardware system comprising at least one processing unit coupled to a memory, wherein the memory is encoded with computer executable instructions that when executed cause the at least one processing unit to: authenticate a first user device responsive to receipt of a first set of credentials of an agent associated with a user, the first set of credentials associated with a legacy server; receive context information from the first device, the context information indicative of a manner in which the first user device accessed a service; authenticate a second user device responsive to receipt of a second set of credentials of the agent associated with the user; and provide the context information to the second device responsive to the second device accessing the service. Other instructions may, among other operations, cause the processing unit to: associate the context information with the agent; receive context information from a proxy executing on the first device; and/or establish a proxy connecting between the user device and the legacy device. The first set of credentials of the agent may be received from a proxy executing on the first device and the second set of credentials of the agent may be received from a web application executing on the second device.

Certain implementations may include a computer hardware system comprising at least one processing unit coupled to a memory, wherein the memory is encoded with computer executable instructions that when executed cause the at least one processing unit to receive credentials associated with a user from a user device; determine whether the credentials are valid; and if the credentials are valid, provide a token associated with the user device; and provide a set of credentials on demand to the user device during a period of time for which the token is valid. Other instructions may cause the processing unit to, among other operations, provide a response indicating that the credentials are not valid, if the credentials are not valid; determine whether the credentials correspond to credentials stored in an agent associated with the user; direct a web browser to a web-based interface configured to receive the credentials; provide a first set of credentials associated with the user to a proxy and provide a second set of credentials associated with the user to a web application; remove the token after a period of time after the token is provided; and/or establish a proxy connection between the user device and the legacy device.

DETAILED DESCRIPTION

Figure 1:
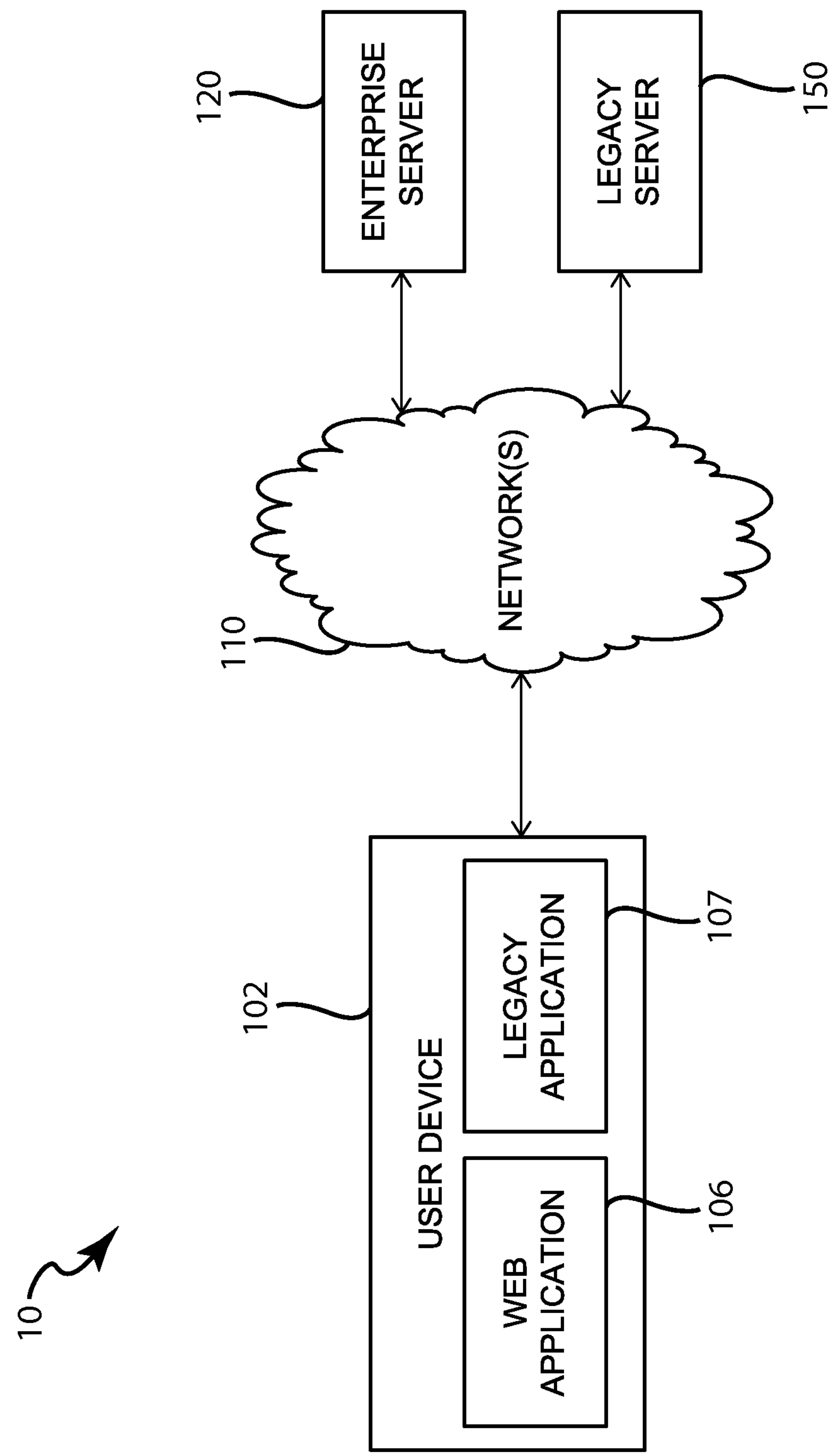
FIG. 1 is a schematic diagram of a computer networking environment according to an embodiment of the present disclosure.

Systems and methods for integrative legacy context management are disclosed herein. Certain details are set forth below to provide a sufficient understanding of embodiments of the disclosure. However, embodiments of the disclosure may be practiced without these particular details. Moreover, the particular embodiments are provided by way of example and should not be construed as limiting. In other instances, well-known circuits, control signals, timing protocols, and software operations have not been shown in detail to avoid unnecessarily obscuring the invention.

Disclosed embodiments generally relate to authentication. Briefly, authentication includes verifying an identity of a user of a device and in response, granting the user access to one or more services, such as an application or database. Authentication may be performed using a number of authentication types. The first, and most common type of authentication, is directed to authenticating using information known by a user. This may include authenticating using credentials, such as a username, password, and/or access code. The second type of authentication is directed to authenticating using something possessed, such as a credit card, debit card, or smart card. The third type of authentication is directed to authenticating using characteristics, such as a location or a biometric characteristic (e.g., fingerprint). In some instances, authentication may be implemented using multi-factor authentication. In most systems, multi-factor authentication requires satisfaction of at least two of the three proffered authentication types.

Certain embodiments may further relate to Single Sign-On (SSO) authentication. SSO authentication includes mechanisms where, in response to an authentication of a user, the user may be provided with access to a plurality of applications or services provided by one or more servers (e.g., enterprise services, legacy servers). Typically, permission levels for each of the respective applications (or services) may be individually determined based on the identity of the user, and in most cases, a user may be SSO-authenticated after providing an SSO server with valid user credentials (e.g., any combination of a valid user name, a password, biometrics, and/or other credentials). Once authenticated, a user may access the applications as if the user had been authenticated with each application individually. In some instances, the SSO server may provide (e.g., generate) a token which may be leveraged in exchange for one or more sets of credentials. The credentials may subsequently be used for authentication. In other instances, the SSO server may authenticate with one or more applications on behalf of the user, for example using credentials assigned to the user and specifically corresponding to each respective application. Thus, in completing a SSO authentication with the SSO server, the user may access any of the aforementioned applications without providing any additional credentials. Use of SSO authentication may: reduce the need for a user to remember or store a multitude of passwords; improve efficiency at an enterprise level by simplifying account management; and/or increase protection of user credentials by reducing the misappropriation of credentials, for instance, through phishing. Users may use SSO authentication to access applications provided not only at an enterprise level, but on remote and/or third-party servers as well.

With reference to FIG. 1, a user device 102 may communicate over a network 110 with an enterprise server 120 using a web application 106 and/or may communicate over the network 110 with a legacy server 150 using a legacy application 107. Each of the enterprise server 120 and the legacy server 150 may be a server hosting one or more applications that may be used to provide services directed to, for instance, business processes, information flows, and/or data storage. Accordingly, the web application 106 may be used to access services provided by the enterprise server 120 and the legacy application 107 may be used to access services provided by the legacy server 150. Though reference is made herein to a single enterprise server 120 and a single legacy server 150, it will be appreciated that described examples may include one or more other enterprise servers 120 and/or one or more other legacy servers 150 providing any number of services.

In some examples, the web application 106 may be used to access both services provided by the enterprise server 120 and services provided by the legacy server 150. Briefly, the web application 106 may authenticate with the enterprise server 120 using one or more authentication mechanisms, such as tokens and access keys, and may authenticate with the legacy server 150 using one or more of a more limited number of authentication mechanisms, such as a username and password login. Because the number and/or type of authentication mechanisms employed by the legacy server 150 may be limited, the application of the legacy server 150 may not properly integrate with the application of the enterprise server 120. As a result, the web application 106 may be required to separately authenticate with each of the enterprise server 120 and the legacy server 150.

To circumvent the need for separate authentication, the enterprise server 120 may employ a mechanism allowing the web application 106 to authenticate with the enterprise server 120 and access services provided by the legacy server 150. Providing authentication in this manner, however, may still require that the web application 106 authenticate with the enterprise server 120 using a separate authentication mechanism for each server 120, 150, and further may require that each set of credentials provided be associated with one another such that the enterprise server 120 may determine that a same user has been authenticated in each instance.

To ensure credentials are associated with one another, credentials for a user typically must be cached on the user device 102, cached on the enterprise server 120, or requested by the enterprise server 120 each time access to a legacy server 150 is requested. Briefly, each of these approaches may include one or more trade-offs. For instance, caching credentials on the user device 102 may create a security risk as credentials may be exposed by the user device 102 once the user device 102 has been removed from the enterprise environment. On the other hand, caching credentials on the enterprise server 120 may result in caching duplicate credentials across each of a plurality of authentication mechanisms (e.g., one duplicate for the enterprise server 120 and one duplicate for each legacy server 150). Finally, requesting credentials each time a user requests access to a legacy server 150 may result in a cumbersome user experience.

Figure 2:
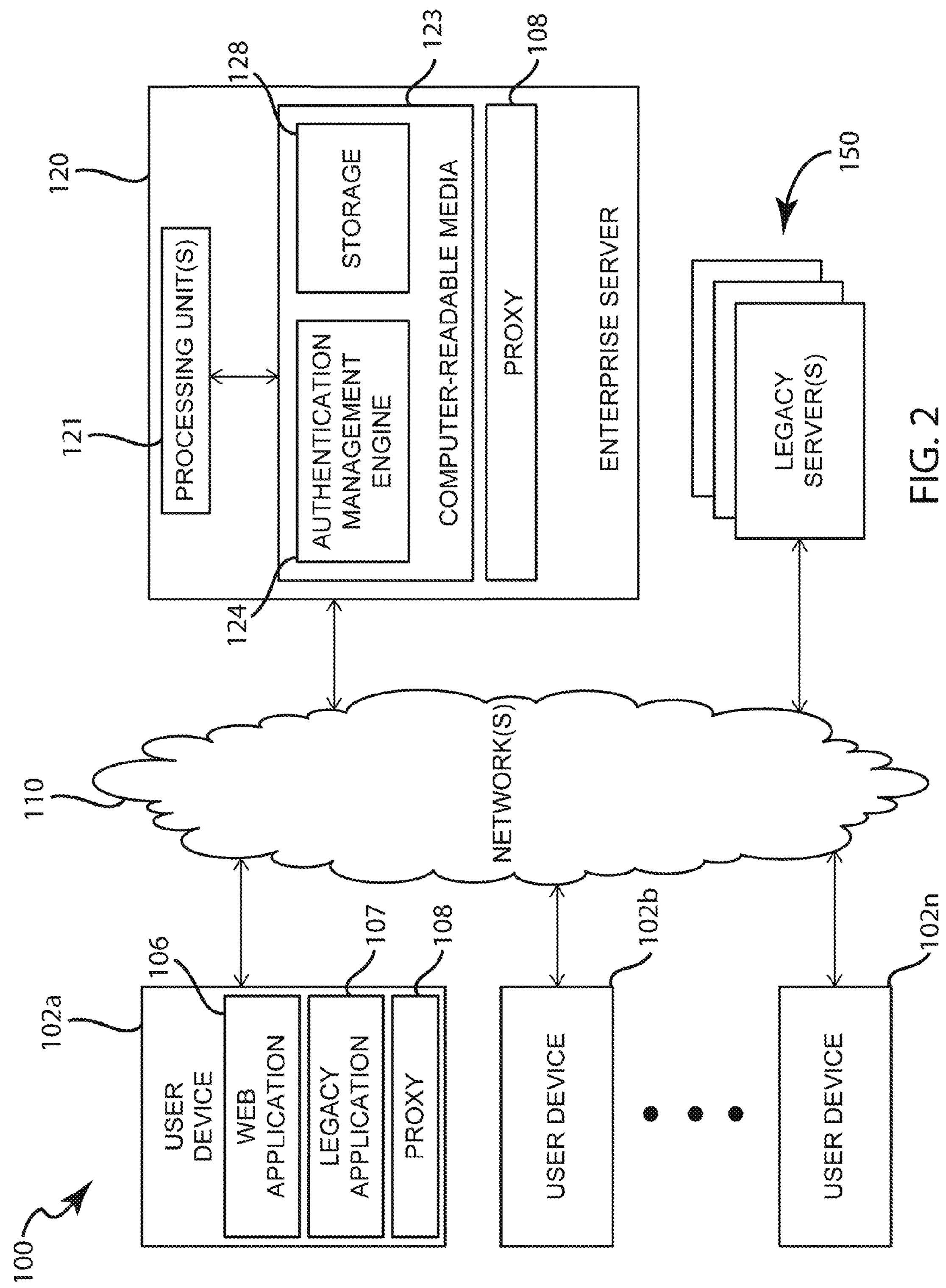
FIG. 2 is a schematic diagram of a computer networking environment according to an embodiment of the present disclosure.

FIG. 2 is a schematic diagram of an embodiment of a computer networking environment 100. Each of a plurality of user devices 102 may comprise a computing device, including but not limited to a modem, a router, a gateway, a server, a thin client, a laptop, a desktop, a computer, a tablet, a media device, a smart phone, a television, a phablet, a cellular phone or other mobile device, or any combination or sub-combination of the same. Each of the plurality of user devices 102 may include a memory encoded with executable instructions that may operate in conjunction with one or more processing units of the user device 102 to provide functionality allowing execution of a web application 106, a legacy application 107, and/or a proxy 108. The web application 106 may be an application, such as a browser, that operates in accordance with one or more web-based programming languages and may be configured to access one or more services (e.g., web-based services) hosted by the enterprise server 120. In certain implementations, the browser may be software configured to enable a user to interact with networked or local resources such as web pages. In some examples, a web application 106 may further be used to access one or more services provided by a legacy server 150. A legacy application 107 may be an application, such as an executable program, that may interface with one or more services provided by legacy servers 150. The proxy 108 may be configured to act as an intermediary between the legacy application 107 and legacy servers 150. The proxy 108 may enable a legacy application 107 to authenticate with an enterprise server 120 and further may provide integrative legacy context management. However, as will be described, the proxy 108 need not be located on the user device 102 in all embodiments. In addition to, or instead of being located on the user device 102, the proxy 108 may operate on another networked device such as enterprise server 120.

While examples are described herein with reference to a single legacy application 107 and legacy server 150, the proxy 108 may act as an intermediary between any number of legacy applications 107 and any number of legacy servers 150 operating in the computer networking environment 100. Moreover, while the user device 102*a* is shown as including a web application 106, a legacy application 107, and a proxy 108, it will be appreciated that each of the user devices 102 may include any number web applications 106, legacy applications 107, and/or proxies 108. By way of example, a user device 102 may include three web applications 106 and no proxy 108, while another user device 102 may include two legacy applications 107 and a proxy 108.

Each of the user devices 102 may be configured to communicate over a network 110 with any number of devices, including but not limited to the enterprise server 120 and the legacy server 150. The network 110 may comprise one or more networks, such as local area networks (LANs), wide area networks (WANs), metropolitan area networks (MANs), cellular networks, and/or the Internet. Communications provided to, from, and within the network 110 may wired and/or wireless, and further may be provided by any networking devices known in the art, now or in the future. Devices communicating over the network 110 may communicate with any communication protocol, including TCP/IP and UDP protocols. Moreover, user devices 102 may be configured to communicate using known protocols such as HTTP, HTTPS, SSL, or any protocol derived therefrom.

The enterprise server 120 may include one or more processing units 121 and computer readable media 123. Herein, the term computer readable media is used to refer to a single computer readable medium in some embodiments, and in other embodiments multiple computer readable media in communication with one or more processing units, such as the processing units 121. The computer readable media 123 may also include a storage 128. The executable instructions for the authentication management engine 124 may include instructions for managing authentication of one or more users of user devices 102, further examples of which are provided below. Although the executable instructions for the authentication management engine 124 are shown on a same computer readable media 123, in some embodiments any or all sets of instructions may be provided on multiple computer readable media and may not be resident on the same media. Accordingly, computer readable media 123 as used herein includes one or more computer readable media 123 and/or the storage 128. Computer readable media 123 and/or storage 128 may include any form of computer readable storage or computer readable memory, transitory or non-transitory, including but not limited to, externally or internally attached hard disk drives, solid-state storage (such as NAND flash or NOR flash media), tiered storage solutions, storage area networks, network attached storage, and/or optical storage. As described, the instructions stored on the computer readable media 123 may be executed on the one or more processing units 121 or other processing units. The executable instructions for the authentication management engine 124 may be referred to as an "authentication management engine" herein, where the authentication management engine refers to the executable instructions for an authentication management engine 124 executed by the one or more of the processing units 121 and/or other processing units.

The storage 128 may include data that may be utilized by one or more of the processing units 121 during execution of the authentication management engine 124. By way of example, the storage 128 may include authentication information, such as user credentials (e.g., usernames, passwords), authentication keys, encryption/decryption algorithms, and/or authentication rules. In some examples, authentication information may be stored on a per-user basis as one or more respective agents. An agent may be an entity operating or stored on the computer networking environment 100. For example, an agent may be a program that acts on behalf of a user, such as one stored within computer-readable memory on the user device 102 or the storage of the enterprise server 128 and executed on a processing unit. The agent may be or also include a respective data set including the underlying credentials of a user for the enterprise server 120 and any number of legacy servers 150. Each agent may associate each set of the user's credentials with each other such that SSO authentication may be provided in accordance with examples described herein. The storage 128 may further include context information. Context information may be information describing the use of services provided by the enterprise server 120 and/or legacy servers 150. In some instances, context information may be stored on a per-user basis such that individual use of services may be tracked and/or resumed across any number of user devices 102. As an example, context information may be used to allow a user to access a service of a legacy server 150 using a first user device 102 and subsequently resume use of the service using a second user device 102 at a later time. The storage 128 or another module of the enterprise server 120 may include memory encoded with executable instructions to provide functionality allowing execution of a proxy 108. The execution of the proxy 108 (e.g., on one or more processing units 121) may enable the enterprise server 120 to operate, at least in part, as a proxy server. However, the proxy 108 need not be installed or run on the enterprise server 120. For example, the proxy 108 may be stored, installed, or run elsewhere.

Using the proxy 108 to operate the enterprise server 120 as a proxy server may allow the enterprise server 120 to become a generic intercept device that intercepts and routes requests between the legacy server 150 and the calling application (e.g., legacy application 107). This arrangement may allow for a decreased footprint on the user device 102. In some embodiments, operating the enterprise server 120 as a proxy server may allow for upgrading of the proxy 108 more readily and extend the level of integration service provided for new and legacy applications. Operating the proxy 108 on the enterprise server 120 may also allow for the enterprise server 120 to perform additional functions such as hot failover to a live backup and integration abstraction to selectively re-route requests to new service providers as a legacy application is itself phased out of existence. In some embodiments of enterprise server 120 operating as a proxy server, the calling application (e.g., legacy application 107) may be redirected to a new TCP/IP address and not require anything further to communicate with a centralized proxy. However, even in such configurations, the user device 102 may still have a local proxy as needed for device or application specific reasons.

Each service provided by legacy servers 150 may be an application, a database, and/or any other service that may be accessed by a user device 102. In some embodiments, for example, one or more legacy servers 150 may be configured to stream, transmit, or otherwise provide data from a database to a user device 102 in response to one or more requests for the same. Each of the legacy servers 150 may communicate with the enterprise server 120 and/or one or more user devices 102 over the network 110, and may communicate using any protocol known in the art, including TCP/IP, UDP, HTTP, HTTPS, SSL, any protocol derived therefrom, or any combination or sub-combination of the same. In other instances, the legacy servers 150 may communicate with the enterprise server 120 using other communication methodologies known in the art, now or in the future.

Figure 3:
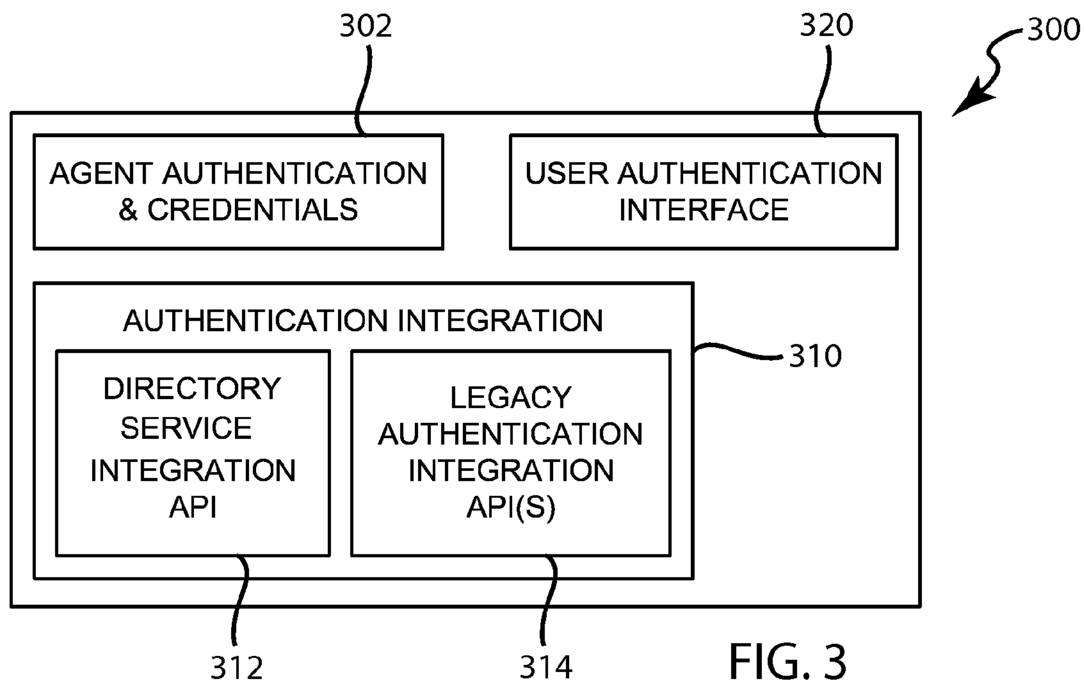
FIG. 3 is a schematic block diagram of an authentication management engine according to an embodiment of the present disclosure.

FIG. 3 is a schematic block diagram of an authentication management engine 300 according to an embodiment of the present invention. The authentication management engine 300 may be used to implement the authentication management engine 124 of the enterprise server 120 of FIG. 2. The authentication management engine 300 may include an agent authentication and credentials block 302, an authentication integration block 310, and a user interface block 320. The authentication integration block 310 may include one or more directory service integration APIs 312 and may include one or more legacy authentication integration APIs 314. In certain implementations, a directory service may be a database or other means for organizing data. Examples of a directory service include but are not limited to Microsoft™ Active Directory™, Novell™ Directory Services, directories accessible according to the X.500 protocol, and directories accessible according to the Lightweight Directory Access Protocol (LDAP). In certain implementations, directory service integration APIs 312 may be APIs configured to interact or interface with a directory service.

The agent authentication and credentials block 302 may be configured to provide authentication services to user devices 102 communicating with the authentication management engine 300. Generally, the agent authentication and credentials block 302 may manage authentication of user devices 102, as well as requests for credentials provided by user devices 102 in accordance with described examples.

By way of example, and as will be described in further detail, the agent authentication and credentials block 302 may receive a request from a user device 102 for credentials such that the user device 102 may access the enterprise server 120 or a legacy server 150. If the user is not yet authenticated, the agent authentication and credentials block 302 may reject the request and/or indicate to the user of the user device 102 that authentication is required before credentials may be provided.

In at least one example, if the request for credentials is provided by a web application, such as a web application 106 of FIG. 1, the agent authentication and credentials block 302 may direct the web application to the user authentication interface 320. The user authentication interface 320 may be a web-based interface configured to receive credentials from the requesting user device 102. By way of example, the user authentication interface 320 may include one or more fields for a username, password, and/or authentication key. The user authentication interface 320 may provide the credentials to the agent authentication and credentials block 302. In another example, the agent authentication and credentials block 302 may receive credentials from the proxy 108 of the user device 102, provided on behalf of the legacy application 107.

Credentials received from the user authentication interface 320 and/or a proxy 108 may be verified by the agent authentication and credentials block 302 based on an application programming interface (API) call to an API included in the authentication integration block 310. The agent authentication and credentials block 302 may provide the received credentials to an appropriate API, and in response, the API may determine whether the credentials are valid such that the user is authenticated. That is, if received credentials are associated with the enterprise server 120, the agent authentication and credentials block 302 may provide an API call and the credentials to the directory service integration APIs 312. If received credentials are associated with a particular legacy server 150, the agent authentication and credentials block 302 may provide the API call and the credentials to a corresponding legacy authentication integration API 314.

Specifically, the directory service integration APIs 312 may serve to authenticate users requesting access to the enterprise server 120. By way of example, the directory service integration APIs 312 may interface with a directory service authentication mechanism to authenticate users with the enterprise server 120 at a domain level. Each of the legacy authentication integration APIs 314 may interface with a respective legacy authentication mechanism to authenticate users with a particular legacy server 150. Each of the authentication mechanisms may be configured to authenticate a user by cross-referencing credentials received in the API call with user authentication data (e.g., an agent associated with the user) stored in the storage 128. Generally, cross-referencing may include any function (e.g. a look up, a reference, or a cross-reference) that is capable of legitimately identifying the agent or the user. The cross-reference may be used to unlock a set of credentials for the agent or user. For example, if the credentials received in the API call were password credentials, cross-referencing may include comparing the password credentials with stored authentication data and indicating whether there is a match. The cross-referencing may, but need not, be a direct comparison of stored values. In certain implementations, hashes or other representations of credentials may be stored, compared, and/or cross-referenced instead of directly storing, comparing or cross referencing the credentials themselves.

In the event that an API call returns an indication that a user is authenticated, the agent authentication and credentials block 302 may provide a token associated with the agent of the user. So long as the token remains valid, the user may thereafter leverage the token to request any set of credentials included with the agent associated with the user.

The user may then use the received credentials to authenticate with one or more legacy servers 150.

Figure 4:
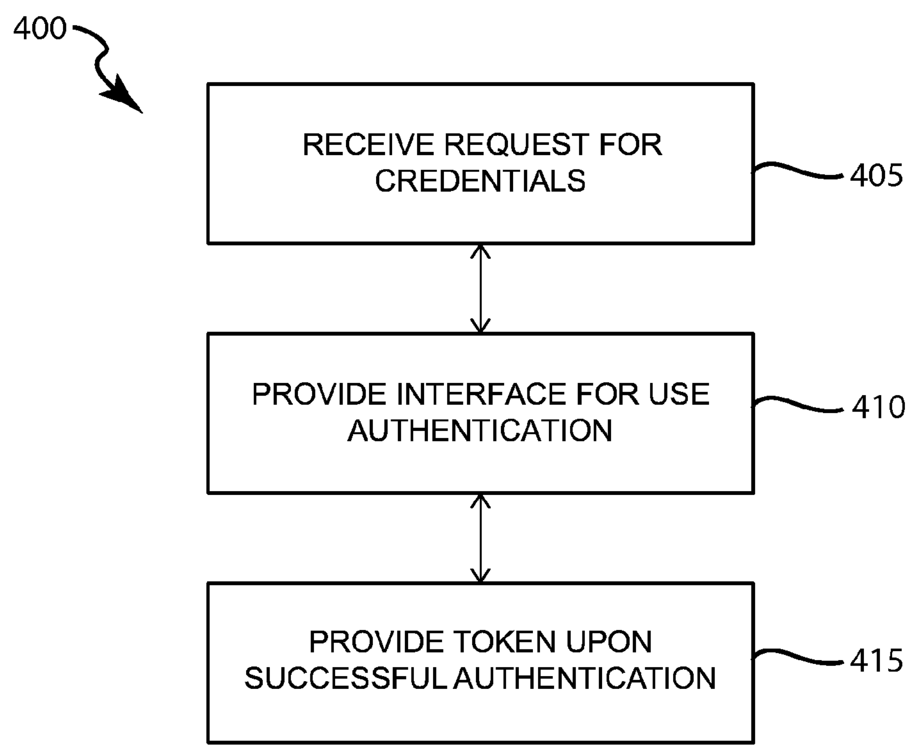
FIG. 4 is a flowchart of a method for implementing a single sign-on authentication of a web application according to an embodiment of the present disclosure.

FIG. 4 is a flowchart of a method 400 for implementing a single sign-on authentication of a web application according to an embodiment of the present disclosure. The method 400 may be implemented using the enterprise server 120 of FIG. 2, and in particular, may be implemented using the authentication management engine of the enterprise server 120.

At a step 405, the authentication management engine may receive a request for credentials from a web application 106 of a user device 102. The request may, for instance, request credentials for authenticating the web application 106 with a legacy server 150. In response to the request, at a step 410, the authentication management engine may provide the web application 106 with a user interface for user authentication. By way of example, the authentication management engine may direct (or redirect) the web application 106 to a web-based interface including one or more fields configured to receive user credentials from the user device 102. As described, user credentials received in this manner may include a user name, password, authentication key, access code, or a combination thereof. In some examples, aspects of the user interface and/or the type of credentials received by the user interface may be based on a type of the user device 102 used to provide the request at the step 405. By way of example, desktop and laptop computers may be required to provide a username and password, whereas mobile devices may be required to additionally or alternatively provide an access code. Once the enterprise server 120 has received the credentials, the enterprise server 120 may determine whether the credentials are valid. If so, the user is authenticated. If not, the enterprise server 120 may indicate that the credentials are invalid, for instance, by redirecting the web application 106 to a web-based interface indicating the same.

Once a user has been authenticated, at a step 415, the authentication management engine may provide (e.g., generate) a token associated with the user device 102. The token may be leveraged by the user device 102 to provide SSO authentication such that the user device 102 may access the enterprise server 120 and/or one or more other legacy servers 150 without requiring a user to manually provide credentials for each respective access.

By way of example, once a token has been generated at a step 415, a web application 106 may access a service provided by a legacy server 150 by requesting credentials from the authentication management engine. The authentication management engine may recognize the requesting user device 102 as well as that a valid token exists for a user of the user device 102. A valid token may, for instance, be a token that has not yet expired since the most recent authentication of the user. The authentication management engine may retrieve credentials associated with the service to be accessed for the user, and provide the credentials to the user device 102. The user device 102 may in turn provide the requested credentials to the legacy server 150 for access. If a user requests credentials for a service for which the user is not authorized to access (e.g., the user does not have a set of credentials for the service), the authentication management engine may reject the request. In this manner, the authentication management engine may selectively provide credentials to user devices 102 on demand. Generally, any number of web applications 106 may leverage a same token to access the enterprise server 120 and/or legacy servers 150 once a user device 102 has been authenticated as described herein.

In some examples, the authentication management engine may authenticate a user device 102 at the step 410 in response to receiving any valid credentials associated with a user. That is, a user device 102 may be SSO-authenticated using any set of credentials included in the agent of the user. Accordingly, a user may authenticate with the enterprise server 120 using any number of sets of legacy credentials. In other examples, the authentication management engine may require that the user authenticate using the set of credentials specifically associated with the enterprise server 120. This may ensure, for instance, that the user authenticate using more stringent and/or reliable authentication mechanisms than those provided by legacy servers 150.

Figure 5:
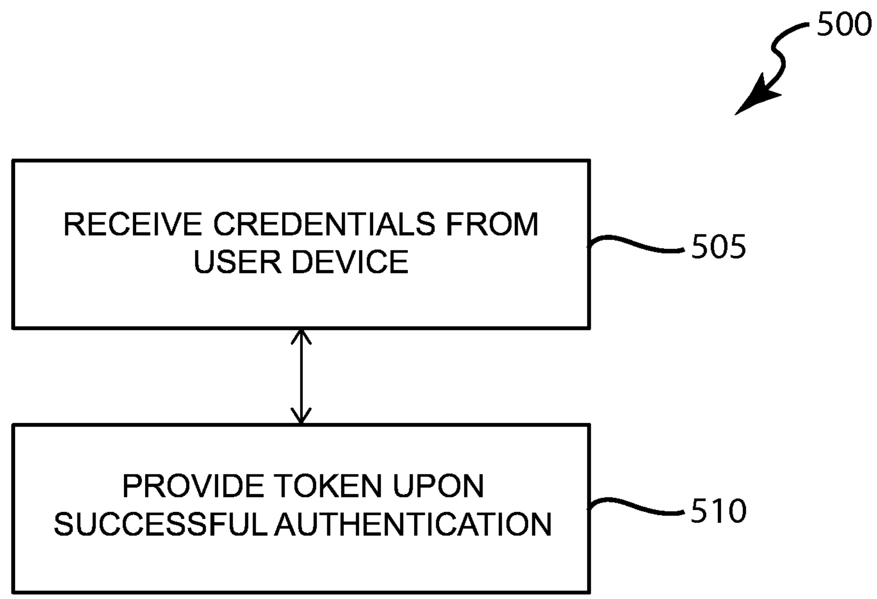
FIG. 5 is a flowchart of a method for implementing a single sign-on authentication of a legacy application according to an embodiment of the present disclosure.

FIG. 5 is a flowchart of a method 500 for implementing a single sign-on authentication of a legacy application according to an embodiment of the present disclosure. The method 500 may be implemented using the enterprise server 120 of FIG. 2, and in particular, may be implemented using the authentication management engine of the enterprise server 120.

At a step 505, the authentication management engine may receive credentials from a user device 102. The credentials may, for instance, be provided by a legacy application 107 and associated with a particular legacy server 150. As previously described, a legacy application 107 of a user device 102 may be configured to authenticate only with a legacy server 150 and not with the enterprise server 120.

Figure 6:
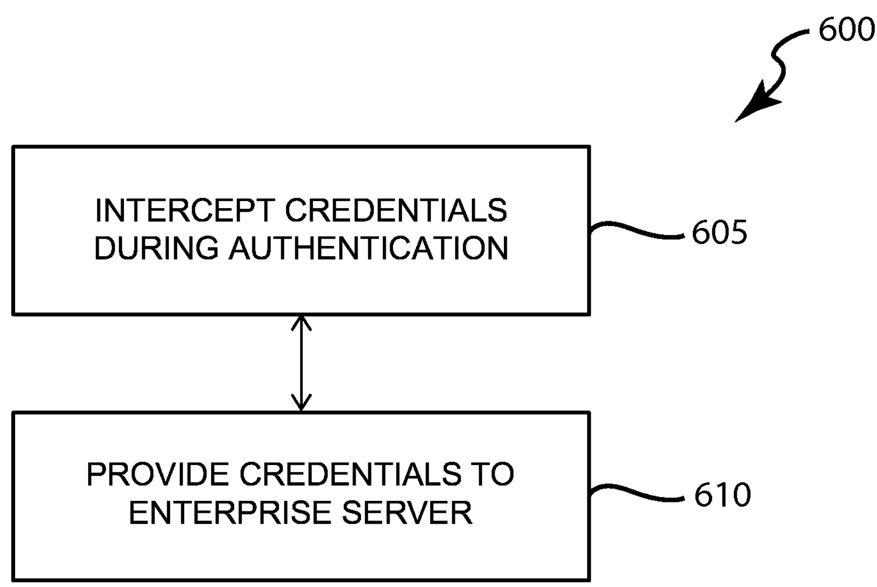
FIG. 6 is a flowchart of a method for providing credentials to an enterprise server according to an embodiment of the present disclosure.

With reference to FIG. 6, in some embodiments (e.g., embodiments where the proxy 108 is executed on the user device 102), credentials intended to be provided from a legacy application 107 to a legacy server 150 may be intercepted by the proxy 108 and provided (e.g., redirected) to the enterprise server 120 at the steps 605, 610, respectively. In other embodiments (e.g., embodiments where the proxy 108 is executed on the enterprise server 120), the calling application (e.g., legacy application 107) may already be directing communication to the enterprise server 120 via the proxy 108 and need not necessarily perform step 610.

Regardless of its location, the proxy 108 may, generally speaking, act as an intermediary (e.g., "man-in-the-middle") between one or more calling applications (e.g., legacy applications 107) and legacy servers 150. The proxy 108 may transparently monitor some or all communication between legacy applications 107 and respective legacy servers 150, and in response to identifying credentials intended to be provided to a legacy server 150, may instead cause the credentials to be provided to the authentication management engine of the enterprise server 120.

In one exemplary embodiment, the proxy 108 may receive a communication from a calling application (e.g., legacy application 107), read the communication, and make a decision based on the content of the communication. In some instances, the communication may be merely forwarded to the legacy server 150 substantially unchanged. In other instances, the communication sent to the legacy server 150 may be a new or modified communication based on the content of the received communication. In still other instances, the communication may not be sent to the legacy server 150. Instead, for example, the enterprise server 120 may respond to the communication as though it were the legacy server 150 or simply not respond at all. This receive-read-decide model may be used, for example, to allow the enterprise server 120 to provide expanded functionality that may not be available on the legacy server 150.

Referring back to FIG. 5, the authentication management engine may determine whether the credentials are valid, and if so, at a step 510, the authentication management engine may provide a token associated with the user device 102. As described, the token may be leveraged to request credentials for authentication with any number of legacy servers 150 as needed.

In some examples, the token provided by the authentication management engine may be leveraged by the proxy 108. In doing so, the proxy 108 may authenticate any number of legacy applications 107 with legacy servers 150 without requiring a user to manually provide additional credentials when accessing other legacy servers 150. By way of example, in response to determining that a legacy application 107 must authenticate with a legacy server 150 to acquire access to the legacy server 150, the proxy 108 may request appropriate credentials from the authentication management engine. As described, the authentication management engine may recognize the requesting user device 102 as well as that a valid token exists for a user of the user device 102, and provide the requested credentials to the proxy 108. The proxy 108 may then provide the credentials to the legacy server 150 on behalf of the legacy application 107, thereby authenticating the legacy application 107. The proxy 108 may leverage the token for any number of legacy applications 107. In some examples, legacy applications 107 may operate as if "unaware" of the proxy 108. That is, the proxy 108 may transparently authenticate legacy applications 107 with legacy servers 150 such that legacy applications 107 may be authenticated with the legacy server 150 without any modification to the legacy application 107 and/or authentication mechanisms of the legacy servers 150.

Both the methods 400 and 500 have been described herein as providing SSO authentication to a user device 102 by way of a token. It will be appreciated that while the method 400 is directed to implementing SSO authentication of a web application 106, and the method 500 is directed to implementing SSO authentication of a legacy application 107, tokens provided in either instance may be leveraged by any application of a user device 102. For example, a token provided by the authentication management engine in response to authentication of a web application 106 (FIG. 4) may subsequently be leveraged by a proxy 108 to request credentials for authentication of a legacy application 107. Conversely, a token provided by the authentication management engine in response to authentication of a legacy application 107 (FIG. 5) may subsequently be leveraged by a web application 106 to request credentials during authentication of the web application 106.

Figure 7:
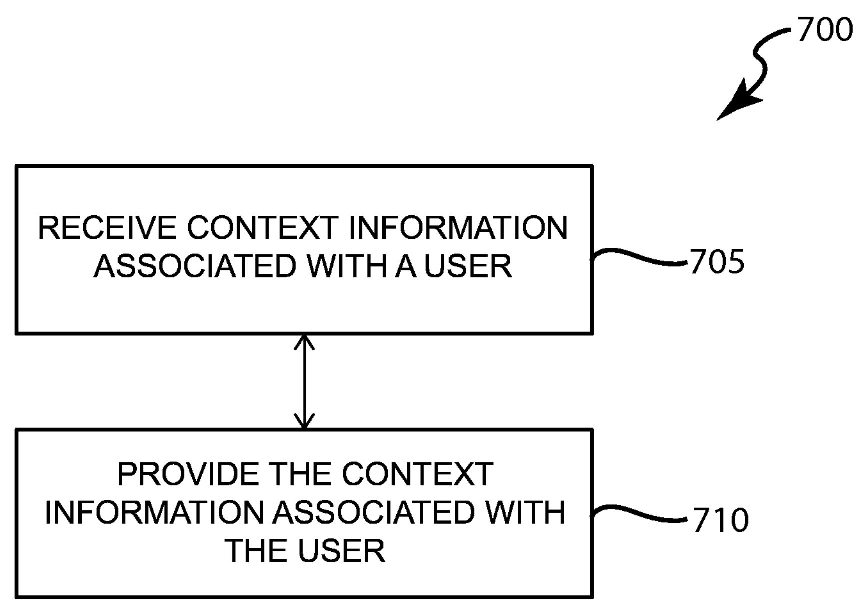
FIG. 7 is a flowchart of a method for managing context information according to an embodiment of the present disclosure.

FIG. 7 is a flowchart of a method 700 for managing context information according to an embodiment of the present disclosure. The method 700 may be implemented using the enterprise server 120 of FIG. 2, and in particular, may be implemented using the authentication management engine of the enterprise server 120.

At a step 705, the authentication management engine may receive context information associated with a user of a first user device 102. The context information may, for instance, indicate a manner in which a user of the user device 102 has accessed a service of the enterprise server 120 or a legacy server 150. As an example, a web application 106 may be used to access a service on a legacy server 150 and may provide context information to the enterprise server 120 indicating which data was accessed by the web application 106 during operation. As another example, a legacy application 107 may be used to access a service on a legacy server 150, and the proxy 108 may provide context information to or receive context information at the enterprise server 120 indicating which data was accessed by the legacy application 107 during operation. Thus, the proxy 108 may provide integrative legacy context management on behalf of legacy applications 108. In some examples, context information may be received at the enterprise server 120 periodically and/or may be provided when an access of the service concludes. Data accessed by a web application 106 and/or a legacy application 107 may, for instance, be data associated with a particular patient in a healthcare provider database and/or may be data associated with particular medical procedures or policies. The enterprise server 120 may associate context information with a user's agent such that the context information is associated with and available to the user via all sets of credentials.

Such a context system may be configured to provide an enterprise-specific context that is both user and enterprise application specific. For example, when proxy 108 is operating on the enterprise server 120, the enterprise server 120 may be configured to provide a centralized proxy service that intercepts or routes the authentication requirements of legacy servers 150 or other data. The enterprise server 120 may use its centralized proxy service to provide consistent context across different devices for the same user or set of credentials. For example, a user may communicate with three different legacy applications on three different legacy application servers. When the proxy service is centralized on the enterprise server 120, the enterprise server 120 is able to perform the authentication, detect that it is the same user across different devices. Once the user is detected, the enterprise server 120 may then provide the correct context even though the user may be accessing the legacy server 150 from a different-than-usual device. This configuration leverages the enterprise server 120's centralized proxy service to detect the user across all of their devices and legacy application integration needs to provide advanced functionality.

The enterprise server 120 may also be able to be configured to provide a device-specific context that is both user and device specific. This configuration may result in the enterprise server 120 automatically granting a user access to a particular legacy server 150 based on certain characteristics of the user request. For example, the enterprise server 120 may see that the user is reasonably operating within the same time-based authentication context as a previous communication (e.g., the user has not logged out of the user device 102 between required password prompts) and automatically provide access to a particular legacy server 150. This type of context may be useful in situations where a user's credentials are needed to perform a particular function in one application and are also needed in an unrelated application to perform an unrelated function on the same device.

At a step 710, the enterprise server 120 may provide the context information associated with the user of the first user device 102. The context information may, for instance, be provided in response to an access by either the first user device 102 or a second user device 102 to the previously accessed service. In either case, the context information may be used to resume operation, at least in part, for the user such that the user need not repeat previous steps. For example, upon accessing a service a second time at the step 710, a user may be presented with information associated with the patient accessed at the step 705.

While the methods 500, 600, and 700 have been described as including particular steps, it will be appreciated that in some instances additional steps may be included the methods 500, 600, and 700, and/or one or more described steps of the methods 500, 600, and 700 may be modified or omitted. For example, with reference to FIG. 4, in some instances, the step 405 may be omitted as a user device 102 need not request credentials to be directed to an authentication interface. A user device 102 may, for instance, specifically request the interface itself from the authentication management engine instead of being redirected in response to a request for credentials.

Reference is made herein with respect to credentials and context information exchanged between user devices 102, the enterprise server 120, and legacy servers 150. It will be appreciated that the exchange of data performed in accordance with described examples may be performed using any encryption known in the art, including but not limited to synchronous key encryption, asynchronous key encryption, and/or hash-based encryption.

From the foregoing it will be appreciated that, although specific embodiments of the invention have been described herein for purposes of illustration, various modifications may be made without deviating from the spirit and scope of the invention. Accordingly, the invention is not limited except as by the appended claims.

What is claimed is:

1. A computer hardware system comprising at least one processing unit coupled to a memory, wherein the memory is encoded with computer executable instructions that when executed cause the at least one processing unit to:

authenticate a first user device responsive to receipt of a first set of credentials of an agent associated with a user, the first set of credentials associated with a legacy server;

receive context information from the first device, the context information indicative of a manner in which the first user device accessed a service;

authenticate a second user device responsive to receipt of a second set of credentials of the agent associated with the user; and provide the context information to the second device responsive to the second device accessing the service.

2. The system of claim 1, wherein the memory is further encoded with computer executable instructions that when executed cause the at least one processing unit to:

associate the context information with the agent.

3. The system of claim 1, wherein the instructions that when executed cause the at least one processing unit to receive context information from the first device include instructions that when executed cause the at least one processing unit to:

receive context information from a proxy executing on the first device.

4. The system of claim 1, wherein the first set of credentials of the agent are received from a proxy executing on the first device and the second set of credentials of the agent are received form a web application executing on the second device.

5. The system of claim 1, wherein the memory is further encoded with computer executable instructions that when executed cause the at least one processing unit to:

establish a proxy connection between the user device and legacy server.

6. A computer hardware system comprising at least one processing unit coupled to a memory, wherein the memory is encoded with computer executable instructions that when executed cause the at least one processing unit to:

receive credentials associated with a user from a user device;

determine whether the credentials are valid; and if the credentials are valid, provide a token associated with the user device; and provide a set of credentials on demand to the user device during a period of time for which the token is valid, wherein the instructions that when executed cause the at least one processing unit to provide credentials on demand to the user device during a period of time for which the token is valid include instructions that when executed cause the at least one processing unit to:

provide a first set of credentials associated with the user to a proxy; and provide a second set of credentials associated with the user to a web application.

7. The system of claim 6, wherein the memory is further encoded with computer executable instructions that when executed cause the at least one processing unit to:

if the credentials are not valid, provide a response indicating that the credentials are not valid.

8. The system of claim 6, wherein the instructions that when executed cause the at least one processing unit to determine whether the credentials are valid include instructions that when executed cause the at least one processing unit to:

determine whether the credentials correspond to credentials stored in an agent associated with the user.

9. The system of claim 6, wherein the instructions that when executed cause the at least one processing unit to receive a set of credentials associated with a user from a user device include instructions that when executed cause the at least one processing unit to:

direct a web browser to a web-based interface configured to receive the credentials.

10. The system of claim 6, wherein the memory is further encoded with computer executable instructions that when executed cause the at least one processing unit to:

remove the token after a period of time after the token is provided.

11. The system of claim 6, wherein the memory is further encoded with computer executable instructions that when executed cause the at least one processing unit to:

establish a proxy connection between the user device and a legacy device.

12. A computer hardware system comprising at least one processing unit coupled to a memory, wherein the memory is encoded with computer executable instructions that when executed cause the at least one processing unit to:

receive credentials associated with a user from a proxy as an intermediary between an application on the user device and a server, the credentials provided on behalf of the application;

determine whether the credentials are valid; and if the credentials are valid, provide a token associated with the user device; and provide a set of credentials on demand to the proxy during a period of time for which the token is valid.

13. The system of claim 12, wherein the memory is further encoded with computer executable instructions that when executed cause the at least one processing unit to:

provide the set of credentials in response to a request for the second set of credentials from the proxy of the user device.

14. The system of claim 12, wherein the memory is further encoded with computer executable instructions that when executed cause the at least one processing unit to:

remove the token after the period of time for which the token is valid expires.

15. The system of claim 12, wherein the memory is further encoded with computer executable instructions that when executed cause the at least one processing unit to:

provide a second set of credentials associated with the user to a web application.

16. The system of claim 12, wherein the memory is further encoded with computer executable instructions that when executed cause the at least one processing unit to:

establish a proxy connection between the user device and the server.

17. The system of claim 12, wherein the set of credentials of the agent is associated with a service provided by a legacy server.

18. The system of claim 12, wherein the proxy is operating on the user device.

19. The system of claim 12, wherein the proxy is operating on an enterprise server configured to intercepts communications between the user device and the server.

* * * * *